United States Patent Office 3,376,341
Patented Apr. 2, 1968

3,376,341
PREPARATION OF N,N-DIMETHYLCYCLO-
HEXYLAMINE
Carl Robert Bauer, Elkton, Md., assignor to E. I. du Pont
de Nemours and Company, Wilmington, Del., a corporation of Delaware
No Drawing. Filed Nov. 5, 1964, Ser. No. 409,311
4 Claims. (Cl. 260—563)

ABSTRACT OF THE DISCLOSURE

Catalytic hydrogenation of N,N-dimethylaniline to N,N-dimethylcyclohexylamine at elevated temperature and pressure. Pressure is reduced during the operation by the release of vapors. Additional hydrogen is then supplied to re-establish pressure and continue the reaction.

This invention relates to an improved process for the manufacture of N,N-dimethylcyclohexylamine by hydrogen reduction of N,N-dimethylaniline.

N,N-dimethylcyclohexylamine is a well-known compound, and its preparation by hydrogen reduction of the corresponding dimethylaniline is also well known. For example, hydrogenation of dimethylaniline was described as early as 1904 by P. Sabatier and J. B. Senderens in Comptes rendus, 138, 457, 1258, as taking place in the vapor phase at 160°–180° C. and atmospheric pressure.

Later, in improving upon the results of the Sabatier and Senderens method, liquid-phase hydrogenations at high temperatures and pressures were devised. F. Klingemann et al., in U.S. 1,782,729, disclose hydrogenation of N-alkylanilines in the liquid phase at 280°–310° C. and 100–150 atmoshperes of hydrogen pressure. In U.S. 1,712,709, Lommel and Goost disclose that the hydrogenation of benzenoid amines to cyclohexylamines at high temperatures and pressures does not proceed smoothly due to formation of by-products. These patentees propose to minimize these side reactions by interrupting the reaction before hydrogenation is complete, removing the hydrogenated product by distillation, and then further hydrogenating the unreacted base. In this latter process wherein the hydrogenation of methylaniline was conducted at 280°–300° C. and at pressure of 100 atmospheres, the amount of by-products formed with respect to methylcyclohexylamine was considerably reduced.

The present invention provides a relatively low-temperature (i.e., 150°–180° C.) liquid-phase hydrogenation of N,N-dimethylaniline to N,N-dimethylcyclohexylamine in high yields and with a minimum of by-products. Reaction pressures for this process are in the range of about 300–1000 p.s.i.g., and a closed reaction system which is normally used for this type of hydrogenation is employed. The overall process of this invention is quite conventional. The inventiveness in the claimed process stems from the fact that in certain instances, hydrogen absorption ceases before a stoichiometric amount of this reactant is consumed and that increasing the hydrogen pressure fails to result in further reaction. When this is the case, as is more likely to occur if the temperature is allowed to drift upward, it has been found that further hydrogenation can be effected by venting the reaction system and then repressurizing with hydrogen to the aforementioned operating pressure range. This result is quite unexpected, and it provides a simple means for improving the effectiveness of this type of hydrogenation. Although it may be preferable to defer venting until the reaction has reached the point where hydrogen is no longer being consumed at a reasonable rate, venting at any time after absorption of hydrogen begins will improve yields and minimize by-products.

In venting, the pressure is usually decreased to about half of the operating pressure of the system as of the time the venting is begun. It is preferred to reduce the pressure to the range of about 200 p.s.i.g. to substantially atmospheric. However, one skilled in the art would readily appreciate the fact that venting should not be carried to such a point that any substantial amount of the liquid reaction media is vaporizing and escaping from the system. If desired, a dephlegmator may be installed in the vent line to recover any vaporized amines that might be released. Any unreacted dimethylaniline could be recycled, if one so desires.

As previously mentioned, the reaction may be carried out in conventional equipment of the type which has been previously used to conduct such hydrogenations. The process is normally conducted by introducing the N,N-dimethylaniline and catalyst into a pressure vessel, sealing the vessel, and purging with nitrogen or hydrogen. The vessel is then heated to a temperature range of about 150°–180° C. and pressurized with hydrogen. Absorption of hydrogen usually starts at about 300 p.s.i.g. Preferred hydrogen pressure is normally at least about 400 p.s.i.g.

Nickel is a preferred catalytic material. Such nickel may be finely divided Raney nickel or nickel deposited on a finely divided inert carrier such as alumina, carbon, clay, or kieselguhr. Nickel deposited on kieselguhr is especially suitable for the reaction. In reactions of this nature, it is conventional to use about 0.4–10% by weight of nickel per mol of dimethylaniline. As expected, reaction times will vary depending upon temperature, and they may range from about 4–20 hours. Higher temperatures (170° to 180° C.) of course shorten reaction times, and it is in this range that the need for venting arises.

For a clearer understanding of the invention, the following specific example is given. This example is intended to be merely illustrative of the invention and not in limitation thereof. Unless otherwise specified, all parts are by weight.

Example

A steel autoclave of 6-liter capacity, fitted with gas inlet equipment, mechanical agitation, a recording pressure gauge, a recording thermometer, and an external electrical heater, was charged with 2000 g. of N,N-dimethylaniline and 65 g. of a nickel catalyst supported on clay. The lid of the autoclave was secured in place, and a lead gasket maintained a tight seal between the lid and the main body of the autoclave. Air was displaced from the interior of the autoclave by pressurizing with nitrogen and hydrogen to the highest expected working pressure (1000 p.s.i.g.) and releasing the pressure to atmospheric pressure. Pressurization and releasing was repeated three times with nitrogen and then three times with hydrogen. The autoclave was next pressurized to 300 p.s.i.g. with hydrogen, and heating and agitation were begun. When hydrogen absorption started, as evidenced by a pressure drop, hydrogen pressure was increased to 500 p.s.i.g. and hydrogenation was conducted at 175±5° C. between 400 and 500 p.s.i.g. of hydrogen. Each time hydrogen pressure dropped from 500 to 400 p.s.i.g., it was increased by manual control to 500 p.s.i.g. The number of these 500 to 400 pound drops indicate hydrogenation progress as the hydrogen is consumed in the reaction.

After hydrogen absorption ceased, hydrogen pressure was increased to 1000 p.s.i.g. No significant hydrogen absorption occurred following the increase in pressure. Next, the autoclave charge was vented by releasing the pressure from 1000 to 200 p.s.i.g., and then hydrogen pressure was restored to 1000 p.s.i.g. The venting cycle of pressurization and release was repeated 6 times. The autoclave was then repressurized to 500 p.s.i.g. with hydrogen, and when pressure dropped to 400 p.s.i.g. due to the resumption of hydrogenation, the hydrogen inlet valve was opened until a pressure of 500 p.s.i.g. was restored. This drop in pressure occurred six times after the venting step, thus indicating a significant amount of reaction. After hydrogen was no longer absorbed, the autoclave was discharged through a filter. The filtrate was then purged with nitrogen to remove volatile material, and the conversion to N,N-dimethylcyclohexylamine was determined by potentiometric titration. More specifically, the reduced material was titrated with N/3 hydrochloric acid using a 75:25 (v./v.) mixture of ethanol:water. The results of the titration are given in the table:

TABLE.—EFFECT OF VENTING DURING HYDROGENATION OF N,N-DIMETHYLANILINE

| Run No. | Description of Operation | Number of 500 to 400 p.s.i.g. Pressure Drops before $H_2$ Uptake Stopped | Percent Conversion [1] |
|---|---|---|---|
| 1 (Control) | Hydrogenation at 175±5° C. and 400 to 500 p.s.i.g. $H_2$ pressure, as described in example. | 28 | 57 |
| 2 (Control) | Same as Run No. 1 | 27 | 63 |
| 3 (Control) | do | 27 | 61 |
| 4 (This Invention): | | | |
| (Step A) | Hydrogenated as in Run No. 1 until $H_2$ absorption stopped. | 28 | |
| (Step B) | Increased $H_2$ pressure to 1,000 p.s.i.g. No significant $H_2$ absorption occurred. | 0 | |
| (Step C) | Vented charge to 200 p.s.i.g. and repressurized with $H_2$ to 1,000 p.s.i.g. (6 times). | 0+ [2] | |
| (Step D) | Repressured to 500 p.s.i.g. and continued hydrogenation until $H_2$ absorption stopped. | 6 | 79 |

[1] May include up to about 5% N-methylcyclohexylamine.
[2] No pressure drops except for those associated with venting.

It is apparent from the above table that as a result of venting, the absorption of hydrogen and consequently the conversion of N,N-dimethylaniline to N,N-dimethylcyclohexylamine was significantly increased. In contrast to this, it may be seen that the conventional expedient of increasing hydrogen pressure was without significant effect.

In the example, the venting procedure was carried out a number of times so as to effect a substantially complete removal of the gaseous atmosphere which existed in the autoclave. However, it is also possible to obtain further hydrogenation after only one venting, since a single venting removes a substantial portion of the gaseous materials in the free space of the autoclave.

Further experiments under the conditions described in the example were run with up to 8 ventings and conversions of up to 83%. Also, it is technically feasible to vent at lower temperatures, but economically it is not practical to cool the reaction vessel and heat it up again.

Since it is obvious that many changes and modifications can be made in the above-described details without departing from the nature and spirit of the invention, it is to be understood that the invention is not to be limited to said details except as set forth in the appended claims,

I claim is my invention:

1. In the process of converting N,N-dimethylaniline in the liquid phase to N,N-dimethylcyclohexylamine by hydrogenation at pressures of about 300 to 1000 p.s.i.g. and temperatures of about 150°–180° C. in a closed reaction system in the presence of a catalyst, the improvement which comprises reducing the pressure in said reaction system by releasing vapors therefrom, and then further supply hydrogen to the closed reaction zone at pressures within the aforementioned range, thus further effecting hydrogenation of the N,N-dimethylaniline.

2. The process of claim 1 wherein the temperature is about 170° to 180° C.

3. In the process of converting N,N-dimethylaniline in the liquid phase to N,N-dimethylcyclohexlamine by hydrogenation at pressures of about 300 to 1000 p.s.i.g. and temperatures of about 150°–180° C. in a closed reaction system in the presence of a catalyst, the improvement which comprises reducing the pressure in said reaction system by releasing vapors therefrom when hydrogen fails to be consumed, and then further supplying hydrogen to the closed reaction zone at pressures within the aforementioned range, thus further effecting hydrogenation of the N,N-dimethylaniline.

4. The process of claim 3 wherein the temperature is about 170° to 180° C.

References Cited

UNITED STATES PATENTS

| 1,712,709 | 5/1929 | Lommel et al. | 260—563 |
| 1,782,729 | 11/1930 | Klingemann | 260—563 |
| 3,117,992 | 1/1964 | Duggan | 260—563 |

CHARLES B. PARKER, *Primary Examiner.*

P. C. IVES, *Assistant Examiner.*